US009771880B2

(12) United States Patent
Lee et al.

(10) Patent No.: US 9,771,880 B2
(45) Date of Patent: Sep. 26, 2017

(54) REAL-TIME VEHICLE DATA ACQUISITION AND ANALYSIS

(71) Applicants: Yung-Li Lee, Troy, MI (US); Hussein Dourra, Bloomfield, MI (US); Tana Tjhung, Oakland Township, MI (US); Sangeeta Theru, Troy, MI (US)

(72) Inventors: Yung-Li Lee, Troy, MI (US); Hussein Dourra, Bloomfield, MI (US); Tana Tjhung, Oakland Township, MI (US); Sangeeta Theru, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 539 days.

(21) Appl. No.: 14/279,393

(22) Filed: May 16, 2014

(65) Prior Publication Data

US 2015/0330317 A1 Nov. 19, 2015

(51) Int. Cl.

| | |
|---|---|
| ***G06F 7/00*** | (2006.01) |
| ***G01B 5/30*** | (2006.01) |
| ***F02D 28/00*** | (2006.01) |
| ***F02D 29/02*** | (2006.01) |
| ***F02D 41/28*** | (2006.01) |

(52) U.S. Cl.

CPC ............. *F02D 28/00* (2013.01); *F02D 29/02* (2013.01); *F02D 41/28* (2013.01); *F02D 2200/1002* (2013.01)

(58) Field of Classification Search

USPC ............................................ 701/29.1; 73/760

See application file for complete search history.

(56) References Cited

U.S. PATENT DOCUMENTS 4,821,190 A * 4/1989 Patil .................... F16H 61/0437 477/149
6,729,186 B1 * 5/2004 Sirrine .................. G01H 1/003 73/593
2006/0243055 A1 * 11/2006 Sundermeyer ........... G01N 3/32 73/760
2006/0243056 A1 * 11/2006 Sundermeyer ........... G01N 3/32 73/760
2008/0160937 A1 * 7/2008 Baker .................... G07C 5/085 455/127.5
2010/0100338 A1 * 4/2010 Vik ..................... G01M 5/0033 702/42
2010/0174576 A1 * 7/2010 Naylor ................... G06Q 10/04 701/31.4
2012/0101863 A1 * 4/2012 Truax ................ G06Q 10/0631 705/7.12
2015/0330317 A1 * 11/2015 Lee ......................... F02D 28/00 701/102

* cited by examiner

*Primary Examiner* — Tyler Paige
(74) *Attorney, Agent, or Firm* — Ralph E Smith

(57) ABSTRACT

An engine controller, system and method for collecting vehicle data. Drive torque data is determined using the engine controller in the vehicle and is stored in a memory in the vehicle. The drive torque data is stored in a non-time domain format, and may include a histogram of numbers of revolutions at predetermined intervals of drive torque values and/or a matrix of rainflow cycle counts. The drive torque data is temporarily stored in a buffer prior to being stored in the matrix of rainflow cycle counts using back-checking and binning. The drive torque data is downloaded from the vehicle and transmitted to a central data collection center.

17 Claims, 6 Drawing Sheets

| | | | | | | | | | | | | | | | | | | | | |
|---|---|---|---|---|---|---|---|---|---|---|---|---|---|---|---|---|---|---|---|---|
| TORQUE | -350 | -250 | -150 | -50 | 50 | 150 | 250 | 350 | 450 | 550 | 650 | 750 | 850 | 950 | 1050 | 1150 | 1250 | 1350 | 1450 | 1550 |
| REVOLUTIONS | 0 | 0 | 1 | 6668 | 21180 | 26193 | 1906 | 901 | 537 | 196 | 593 | 33 | 3 | 0 | 0 | 0 | 0 | 0 | 0 | 0 |
| | | | | | | | | | | | | | | TOTAL NUMBER OF REVOLUTIONS | | | | | | 58209 |
FIG. 4
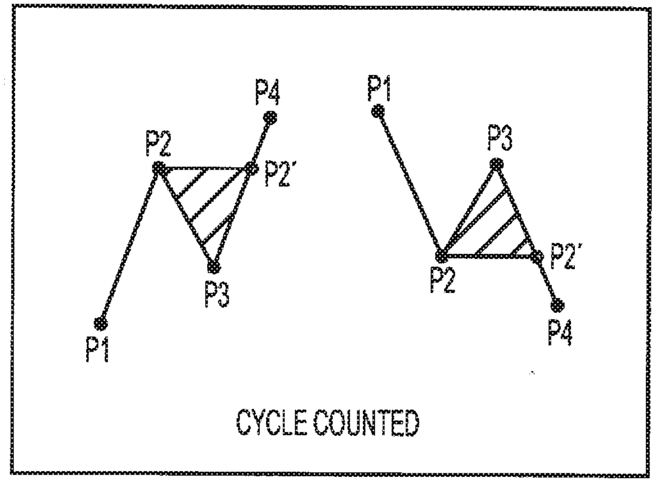
FIG. 5A
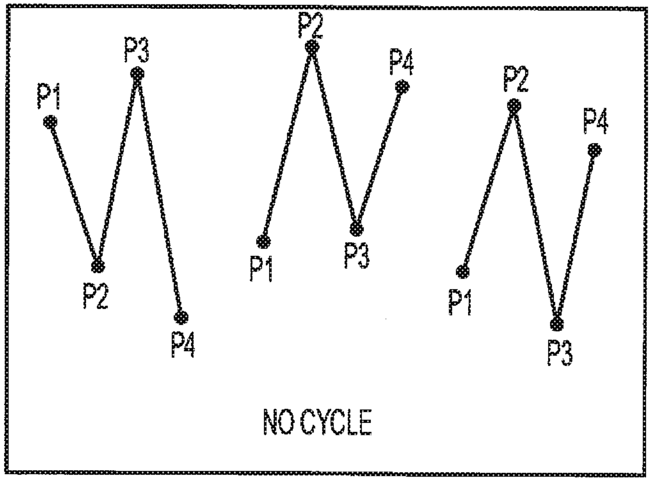
FIG. 5B

REAL-TIME VEHICLE DATA ACQUISITION AND ANALYSIS

FIELD

The technology herein relates generally to the design, analysis and testing of transmission and driveline systems. More particularly, the technology herein relates to real-time vehicle drive torque data acquisition from customer vehicles to improve testing of transmission and driveline systems.

BACKGROUND

Traditionally, a durability validation process for powertrain system and components has three different levels. These levels include vehicle level testing, system level testing, and component level testing. In vehicle level testing, vehicles are commonly tested at a proving ground based on specific powertrain endurance schedules. For system level testing, offline system data such as torque-at-speed and gears are utilized to create transmission and differential dynamometer testing schedules. For component level testing, offline component data such as rainflow cycle results are utilized to develop component bench test criteria.

In practice, a vehicle durability design and validation target is based on a proving ground powertrain endurance schedule. The proving ground powertrain endurance schedule is derived based on percentile customer usage information. For example, a proving ground powertrain endurance schedule can be based on information reflecting the 95th percentile of customer usage. Specifically, the proving ground powertrain schedule is derived by studying the poll data from a pool of vehicle owners who volunteer to participate in answering survey questionnaires. The answers are then translated into engineering requirements as part of the proving ground schedule. However, the resultant engineering requirements tend to be highly subjective due to the subjective nature of customer interpretation and responses to the survey questionnaires.

Additional variableness occurs at the powertrain system and component level testing. Traditionally, for powertrain system and component level testing, the design and validation test target have included historical data collected from various sources and data acquired from a test vehicle running on a proving ground based on the above-mentioned proving ground schedules. However, historical data often lacks context and may not be able to be correlated with actual use patterns. Further, the acquired proving ground data tends to be subjective and prone to error. As a result, the use of the data is limited due to a lack of confidence in the data accuracy. When the data is used, design targets tend to be set artificially high in order to compensate for the low confidence rating.

Thus, there is a need to acquire real-time customer usage data to substantiate and define a more accurate representative of 95th percentile customer usage in an objective manner. There is also a need to improve the quality of data used to construct vehicle simulations and models for prototype durability testing. Additionally, there is a need to improve the efficiency of obtaining and processing component data so as to improve the design and testing stages of powertrain development.

SUMMARY

In one form, the present disclosure provides an engine controller in a vehicle. The engine controller includes a processor configured to determine drive torque data for the vehicle, and a memory configured to store the drive torque data in a non-time domain format. The engine controller may be configured to store the drive torque data in a histogram of numbers of revolutions at predetermined intervals of drive torque values. Alternatively, or additionally, the engine controller may be configured to store the drive torque data in a matrix of rainflow cycle counts. The drive torque data may be temporarily stored in a buffer before being stored in the matrix of rainflow cycle counts. The engine controller may include a communication port to allow download of the stored drive torque data.

In another form, the present disclosure provides a vehicle data collection system. The system includes a vehicle equipped with an engine controller configured to determine drive torque data for the vehicle. The system also includes a data collection device, configured to download the drive torque data from the vehicle. Download of the data may occur when the vehicle is being serviced and may occur at any one of a plurality of remote data collection devices. After download, the drive torque data may be transmitted to a central data collection center. The engine controller may include both a processor configured to determine the drive torque data for the vehicle, and a memory configured to store the drive torque data in a non-time domain format. The engine controller may be configured to store the drive torque data in a histogram of numbers of revolutions at predetermined intervals of drive torque values. Alternatively, or additionally, the engine controller may be configured to store the drive torque data in a matrix of rainflow cycle counts. The drive torque data may be temporarily stored in a buffer before being stored in the matrix of rainflow cycle counts. The engine controller may include a communication port to allow download of the stored drive torque data.

In yet another form, the present disclosure provides a method of collecting vehicle data. The method includes downloading drive torque data from a vehicle, the drive torque data determined using an engine controller in the vehicle and stored in a memory in the vehicle. The method also includes transmitting the downloaded drive torque data to a central data collection center. The drive torque data may be stored in a non-time domain format. The non-time domain format may include a histogram of numbers of revolutions at predetermined intervals of drive torque values. The non-time domain format may alternatively (or additionally) include a matrix of rainflow cycle counts. The drive torque data may be temporarily stored in a buffer prior to being stored in the matrix of rainflow cycle counts. The temporary storage of the drive torque data in the buffer may include the steps of back-checking the drive torque data to identify cycles in compliance with a four-point rainflow cycle rule and binning the drive torque data.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 4 illustrates an example revolutions-at-torque output according to the principles of the present disclosure;

FIGS. 5A and 5B illustrate peaks and valleys of torque data for rainflow cycle determination according to the principles of the present disclosure;

DETAILED DESCRIPTION

Because regenerating data through conducting additional proving ground tests is expensive and time-consuming, and because historical data or consumer-provided data may be unreliable, systems and methods are disclosed herein for generating, collecting and processing drivetrain component data from customer vehicles during the lifespan of the vehicles.

In the disclosed embodiments, a drive shaft torque of a vehicle is determined in the engine controller of the vehicle. The present disclosure describes an process for decomposing the drive shaft torque loading cycles into rainflow cycle counts in real-time. In addition, an additional process measures the vehicle's prop shaft revolutions-at-torque distribution data in real-time. The resultant rainflow cycle count matrix and revolutions-at-torque histogram are stored in an engine controller memory and can be downloaded at a later time.

Further, the present disclosure describes a data acquisition process. The rainflow cycle count matrix and the revolutions at torque histogram data that is stored with an engine controller is downloaded from the vehicle using the data collection device when the vehicle is being serviced at the dealership or a maintenance shop. After download, the data is sent to a data collection center or a testing center where it is further processed and analyzed.

Figure 1:
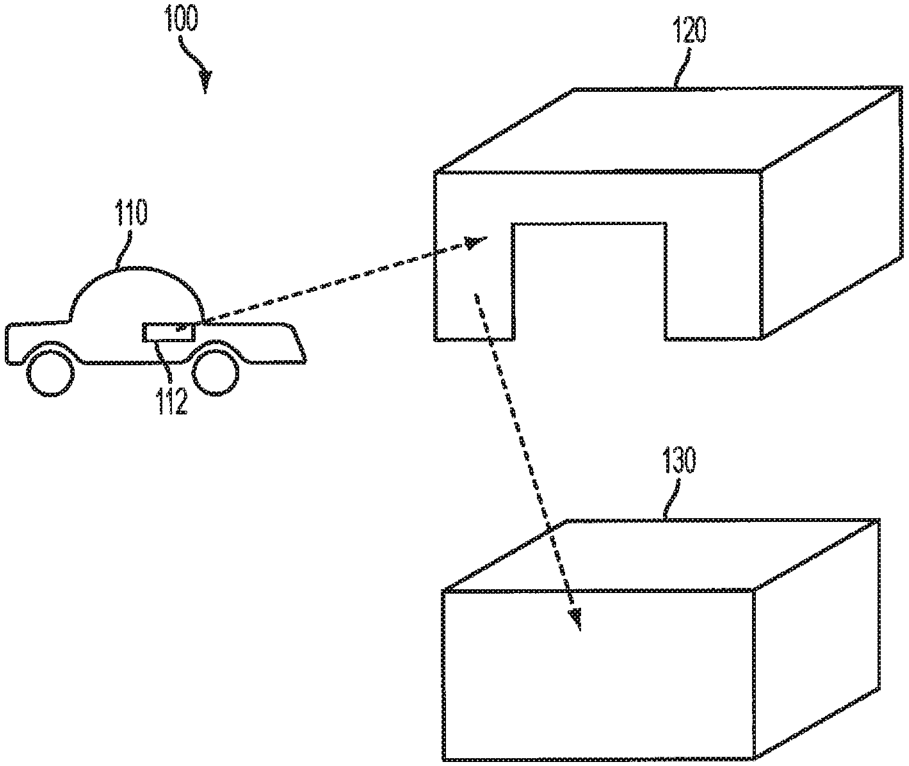
FIG. 1 illustrates a system for collecting drivetrain component data from customer vehicles according to the principles of the present disclosure.

FIG. 1 illustrates a system 100 for collecting drivetrain component data from customer vehicles. In system 100, customer vehicles 110 each include an engine controller 112 that is enabled to collect and process data relating to the use of the vehicle. When a customer takes the vehicle 110 to a dealership or maintenance shop 120 for vehicle maintenance, for example, the technician at the dealership or maintenance shop 120 is authorized to download the collected data from the engine controller 112 in the vehicle 110 and then transmit the downloaded data to a testing center 130 such as a central data collection center. At the testing center 130, the data is received and further processed and analyzed in order to populate the simulations and computational models used at the testing center 130. For example, the collected data could be used to predict the useful life of not only the components actually being used in the customer's vehicle 110, but could also be used as data supporting ongoing design work at the testing center 130.

Figure 2:
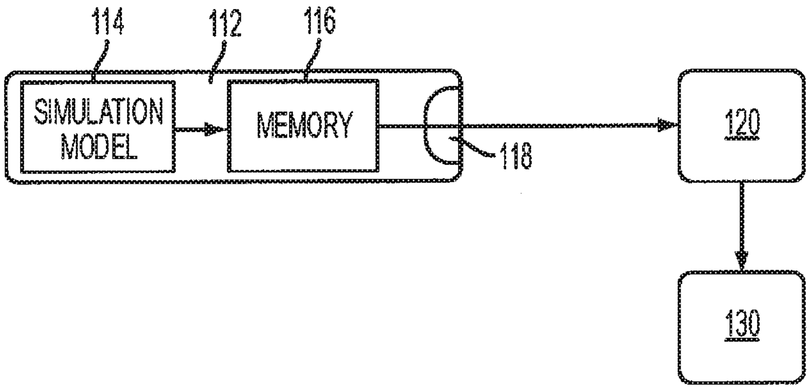
FIG. 2 illustrates a system for collecting drivetrain component data from customer vehicles according to the principles of the present disclosure.

FIG. 2 illustrates additional details relating to system 100. The engine controller 112 is a programmable controller that is installed in customer vehicles 110. The engine controller 112 acquires real-time engineering data from various vehicle systems. For example, the engine controller 112, which may be a programmed processor, includes a simulation model 114 to calculate a real-time driveshaft torque time history. The driveshaft torque time history is calculated based on acquired data from, for example, the vehicle's throttle position, axle ratio and weight, as well as from calibrated powertrain performance curves.

The calculated driveshaft torque time history data is stored in a memory 116 of the engine controller 112. Because the memory 116 in the engine controller 112 is limited (for example, only 80 bytes may be available), the driveshaft torque time history data cannot be stored in the time domain. Instead, the time domain data is converted into other forms that are able to be stored in the limited-capacity memory 116 for later analysis at a testing center. For example, the time domain engineering data is converted into a two-dimensional revolutions-at-torque histogram and into a three-dimensional rainflow cycle counting matrix, as explained below.

Once the data has been processed and stored in the memory 116 of the engine controller 112, it can be periodically downloaded from the engine controller 112. This can be done, for example, at a dealership or maintenance shop 120. The engine controller 112 must include a wired or wireless port 118 for facilitating the data download. Once downloaded, the data is transmitted to the testing center 130. Transmission can be in the form of an email, a data stream or other transmission. At the testing center 130, the data Is extrapolated so as to be usable in predicting the lifespan of the vehicle components and to provide accurate data for correlation with proving grounds and other prototypal testing.

Figure 3:
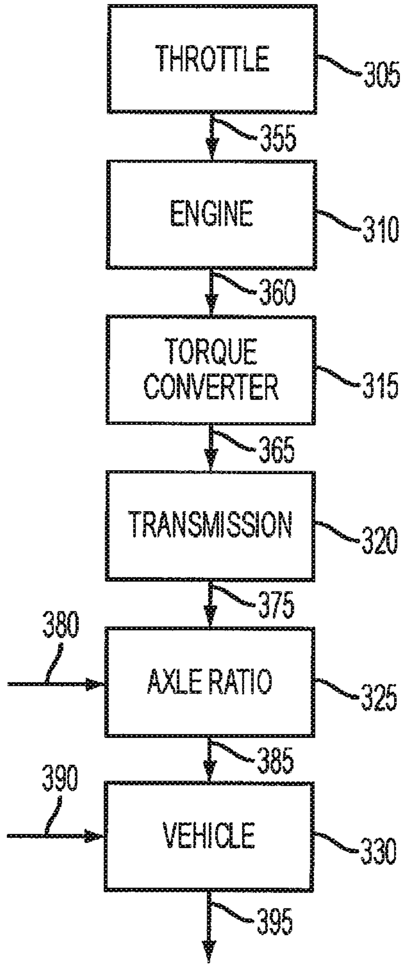
FIG. 3 illustrates a simulation model to be used in an engine controller according to the principles of the present disclosure.

The simulation model 114 in the engine controller 112 is illustrated in greater detail in FIG. 3. The simulation model 114 may be implemented in software running on the engine controller 112, which may be a programmable processor. Alternatively, the simulation model 114 and its component modules may be implemented in hardware or as a combination of software and hardware. The simulation model 114 uses input vehicle parameters to determine the vehicle's drive torque. The simulation model 114 includes a throttle module 305, an engine module 310, a torque converter module 315, a transmission module 320, an axle ratio module 325 and a vehicle module 330. The throttle module 305 simulates a throttle control signal 355 that is based on desired vehicle performance. The throttle control signal 355 is input to the engine module 310. The engine module 310 calculates engine torque 360 that is used by the torque converter module 315. The output of the torque converter module 315 (torque signal 365) is fed to the transmission module 320. The transmission module 320 multiplies the input torque signal 365 with a gear ratio based on the vehicle's transmission's current state to produce a transmission output prop torque signal 375. The axle module 325 uses the prop torque signal 375 and a final drive ratio signal 380 to determine an axle torque signal 385. The vehicle module 330 uses the axle torque signal 385 and one or more inputs 390 representing variables such as aerodynamic drag and tire rolling resistance to determine an overall drive torque 395. Thus, the engine controller 112 uses the simulation model 114 to determine the vehicle's drive torque under various conditions and at various times.

While the engine controller 112 could store all determined drive torque values with corresponding time values, the memory 116 of the engine controller 112 would quickly be exhausted. So, in order to conserve memory resources, the drive torque/time data is further refined into a format for more direct application at the testing center.

One method of further refining the determined data is to store the number of driveshaft revolutions at various torque levels. In other words, the range of possible torque levels can be divided into specific levels, and then a corresponding count of driveshaft revolutions that occur at each torque level is tallied. The number of torque levels can be adjusted based on memory constraints and desired resolution.

An example revolutions-at-torque output is illustrated in FIG. 4. In the example, the range of torque output is divided into twenty levels ranging from −350 ft-lbs to 1550 ft-lbs. Both the range and the number of sublevels can be modified. For each torque level, the number of driveshaft revolutions that occurred at a torque falling within the corresponding torque level is tallied. Thus, in the example of FIG. 4, only three driveshaft revolutions occurred with drive torques ranging from 850 ft-lbs to 950 ft-lbs, while 901 driveshaft revolutions occurred with drive torques ranging from 350 ft-lbs to 450 ft-lbs.

The revolutions-at-torque output of FIG. 4 can be converted into a histogram plot when the data is received at the testing center. The plot can be used to estimate the fatigue experienced at each torque level. For example, "damage" is defined as the ratio between the actual revolutions to the revolutions-to-failure at a given torque level. Therefore, a higher ratio at a given torque level means that the component is closer to failure.

Another method of further refining the determined data is to store the number of prop shaft torque cycles consistent with a four-point rainflow cycle counting rule. Rainflow cycle counting is generally used to convert a load data stream into a compact matrix format that retains essential fatigue loading information.

Torque measurements can be organized into cycles. To do this, the peaks and valleys of the torque measurements are considered. For example, in FIG. 5A, the illustrated torque data includes four consecutive peaks and valleys (points P1, P2, P3 and P4). To organize the torque data into cycles, the intervening peak and valley points (points P2 and P3) are considered. If points P2 and P3 are bounded by the values of points P1 and P4, then points P2 and P3 (and additional point P2') are counted as a cycle. If points P2 and P3 are not bounded by the values of points P1 and P4, then no cycle is counted. Thus, in FIG. 5A, two cycles are illustrated. In FIG. 5B, no cycles are illustrated, since none of the illustrated examples show intermediary points P2 and P3 being bounded by the values of points P1 and P4. This four-point rule is summarized by the statement:

If |P2−P1|>=|P3−P2| and |P4−P3|>=|P3−P2|,
then FROM=P2 and TO=P3,
end.

Figure 6:
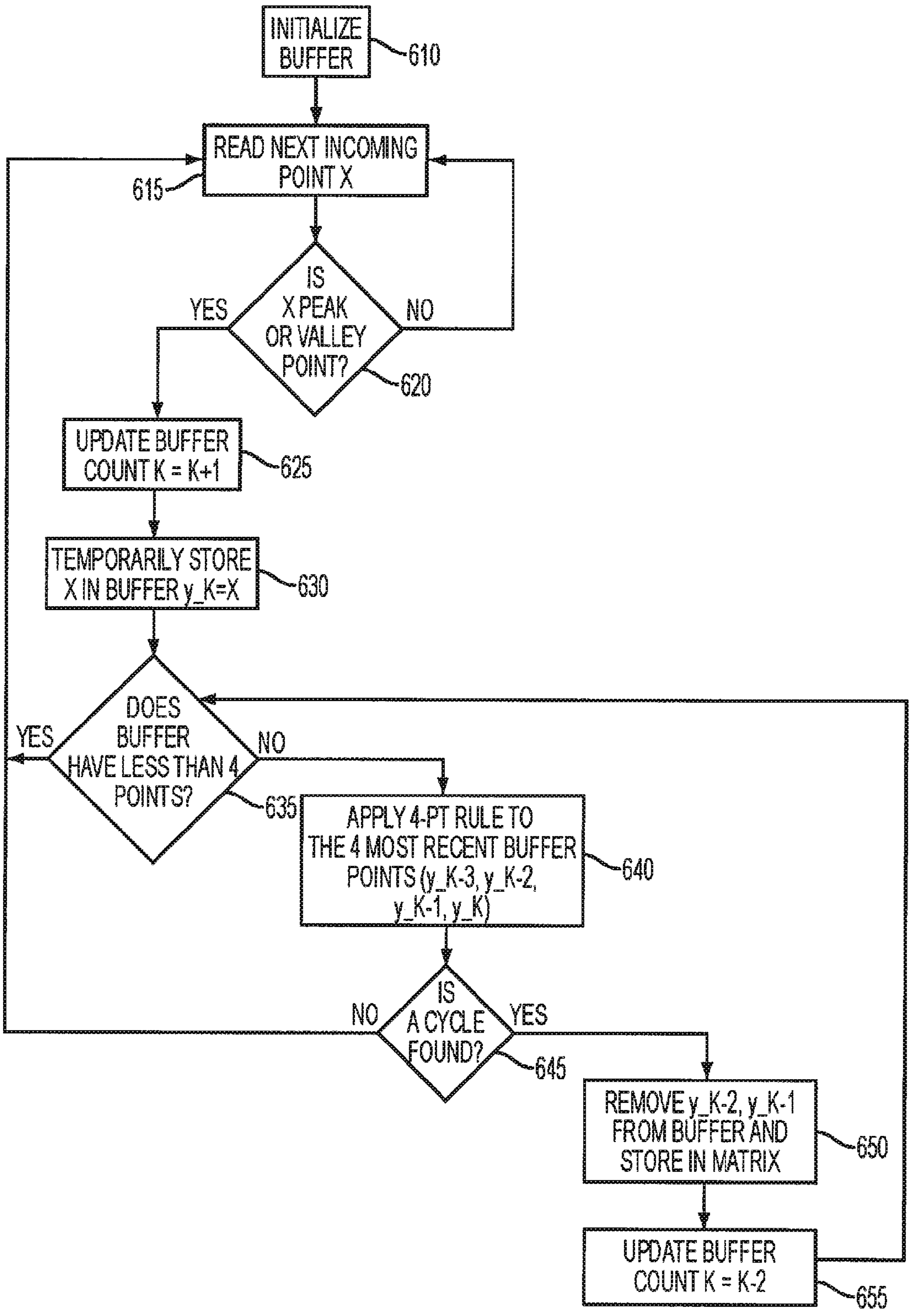
FIG. 6 illustrates a method of operating a buffer memory with respect to a four-point counting algorithm according to the principles of the present disclosure.

To implement the four-point counting algorithm, the memory 116 in the engine controller 112 must include a buffer. Operation of the buffer with respect to the four-point counting algorithm is illustrated in FIG. 6. The operation of the buffer may be implemented in software running on the engine controller 112, which may be a programmable processor. Alternatively, the operation of the buffer may be implemented in hardware or as a combination of software and hardware. At step 610, the buffer is initialized. At step 615, an incoming point, x, is read. At step 620, the point x is checked to determine if it is either a peak or a valley point. If point x is not a peak or a valley point, the next incoming point is read, replacing the previously read point x (step 615). If point x is either a peak or a valley point, then the buffer count k is incremented (step 625) and point x is stored in the buffer as point y_k (step 630), where y denotes a point value stored in the buffer, and k is the buffer point index. If the buffer has less than four points (step 635), then the next peak or valley point is read into the buffer (step 615). If the buffer already has four points (step 635), then the four-point rule is applied to the four most recent buffer points (y_k−3, y_k−2, y_k−1, y_k) (step 640). If application of the four-point rule results in a cycle being found (step 645), then points y_k−2 and y_k−1 are removed from the buffer and stored in a matrix (representing the From-To values for the rainflow cycle) (step 650). The buffer count is then updated (k=k−2) (step 655), and the buffer is re-evaluated to determine if it has four or more points (step 635). Once again, if the buffer has less than four points, the next point is read into the buffer (step 615). If the buffer has four or more points, the four-point rule is applied again (step 640). If, after application of the four point rule, no cycle is found, the next point is read into the buffer (step 615).

So, in general, the buffer acts as a temporary storage for data points that have not been counted as cycles by the four-point rule. Only peak and valley points are stored in the buffer. This helps to minimize the size of the buffer. Almost all buffer points should eventually be counted as cycles and removed from the buffer. The buffer is initialized by storing the first incoming point and the next peak or valley point. This establishes the initial search direction for peak or valley points. After this, the search direction will always alternate between up or down. After initialization, the buffer will never have less than two points.

When a peak or valley point is detected, it is stored, so the buffer grows by one point. Next, the last four points in the buffer are checked by the four-point rule. If the four-point rule passes, two points will be removed from the buffer. Therefore, there is a net loss of one point in the buffer. However, there may be instances when the four-point rule does not pass for a long period of time, meaning that the buffer could grow without bounds unless additional points can be removed. "Back-checking" involves re-checking the last four points in the buffer every time the four-point rule passes and two-points are removed, since it is possible that more points can be removed because the sequence of the last four points has changed. There is no need to back-check if the four-point rule fails as the preceding points in the buffer have already failed the four-point rule with the same sequence of points. Thus, in practice, back-checking is an efficient way of controlling the buffer size.

After a round of back-checking, the points stored in the buffer must have a pattern given by one of three cases. In a first case, the peak points are all strictly increasing while the valley points are all strictly decreasing. In a second case, the peak points are all strictly decreasing while the valley points are all strictly increasing. A third case is a combination of the first case followed by the second case. Points that do not follow the stable patterns given by any of the three cases are counted as cycles by the four-point rule and are removed from the buffer.

Figure 7:
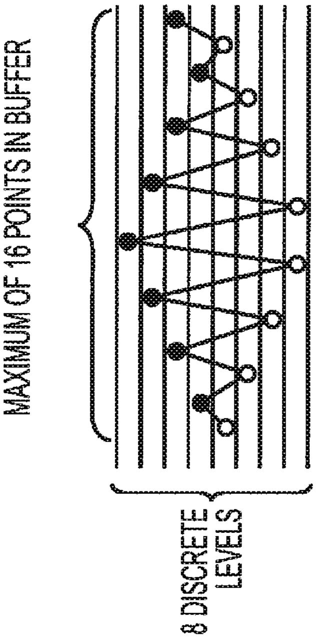
FIG. 7 illustrates a maximum amount of torque data to be stored in a buffer in relation to a number of discrete data levels according to the principles of the present disclosure.

When points stored in the buffer fall into the third case, the buffer can approach its maximum length. The maximum possible buffer length is two times the number of discrete data levels. For example, if the data has n=8 discrete levels, the maximum buffer length is 2n=16 points, as shown in FIG. 7.

If the data values are represented in single-precision format (2ˆ32 discrete levels), then the maximum buffer length will be 2×2ˆ32, which is around 8.6 billion points. However, if the data values are represented by a 1-byte number (2ˆ8 discrete levels), then the maximum buffer length will be 2×2ˆ8, which is 512 points long, meaning that the maximum buffer size will be about 0.5 kB. If the data values are represented by two-byte numbers (2ˆ16 discrete levels), the maximum buffer length will be 2×2ˆ16=131,072 points long, or approximately 262 kB.

Figure 8A:
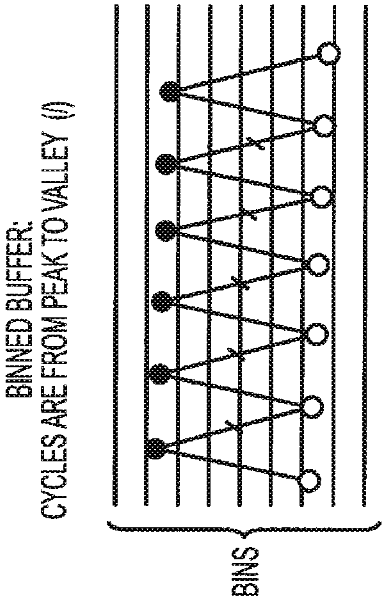
FIGS. 8A and 8B illustrate four-point cycle determination results with and without binning according to the principles of the present disclosure.
Figure 8B:
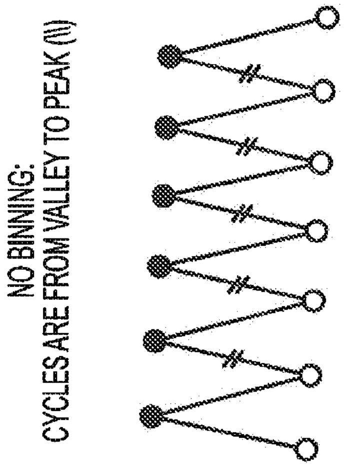

Binning can result, however, in some inaccuracies. For example, in FIG. 8A, the peak points all lie in the same bin interval, even though they each are progressively lower than the previous peak. When binning is used, each peak would be considered to have an equal value. Similarly, in FIG. 8B, the valley points all lie in a same bin interval as well, even though they also each are progressively lower than the previous valley. When binning is used, each valley would be considered to have an equal value. Thus, when binning is used, application of the four-point rule will result in cycles being counted from peak to valley. However, when binning is not used, application of the four-point rule will result in cycles being counted from valley to peak. Thus, errors can occur. However, as long as bin intervals are small enough, the errors are able to fall within an acceptable range.

Therefore, a combination of back-checking and binning ensures that a small buffer size may be used in order to collect four-point rule rainflow cycle data. Accordingly, both four-point rule rainflow cycle data and revolutions-at-torque output data is able to be stored in the limited memory 116 of the engine controller 112.

By using the engine controller 112 with the memory 116 configured to use measured vehicle parameters in order to simulate or determine other vehicle parameters (such as drive torque, for example) and to store the revolutions-at-torque data and rainflow cycle data in a sparse format conducive to limited-capacity memory, timely and accurate reporting of vehicle drivetrain component data can be reported to a vehicle manufacturer for population of data simulations and computational models. The data stored in the memory 116 of the engine controller 112 is able to be downloaded when the vehicle 110 is taken to a dealership or maintenance shop 120 for vehicle maintenance. The downloaded data is transmitted to a testing center 130. At the testing center 130, the revolutions-at-torque data and rainflow cycle data is received, processed and analyzed in order to predict the useful life of not only the components actually being used in the customers vehicle 110, but also in order to support ongoing design work at the testing center 130.

What is claimed is:

1. A vehicle data collection system, the system comprising:

a vehicle comprising a driveshaft and an engine controller, the engine controller comprising:

a processor configured to:

determine driveshaft torque data by utilizing a simulation model to calculate torque at the driveshaft based on a set of vehicle data including at least one of a vehicle throttle position, a vehicle axle ratio, and a vehicle axle weight, wherein the driveshaft torque data (i) represents torque at the driveshaft for each revolution of the driveshaft over a period in a time-domain and (ii) comprises a plurality of peaks and valleys corresponding to local driveshaft torque maximums and minimums, and using the driveshaft torque data, generate a revolutions-at-torque output comprising (i) a plurality of distinct ranges of driveshaft torque and (ii) counts for each driveshaft torque range, each count being indicative of a particular driveshaft torque of the driveshaft torque data falling within a particular driveshaft torque range, and a memory (i) having a limited capacity such that it is incapable of storing the driveshaft torque data and (ii) configured to store information comprising the revolutions-at-torque output; and a data collection device configured to download the information from the memory.

2. The system of claim 1, wherein the data collection device is configured to download the information when the vehicle is being serviced.

3. The system of claim 2, further comprising a central data collection center configured to receive the downloaded information upon transmission by the data collection device.

4. The system of claim 3, wherein the central data collection center is configured to utilize the information to predict a useful life of at least one of the driveshaft and a component related to the driveshaft.

5. The system of claim 4, wherein the central data collection center is configured to predict the useful life of at least one of the driveshaft and the driveshaft -related component by:

converting the revolutions-at-torque output to a histogram plot; and utilizing the histogram plot to estimate a fatigue experienced by the at least one of the driveshaft and the driveshaft-related component at each of the plurality of distinct ranges of driveshaft torque.

6. The system of claim 3, wherein the central data collection center is configured to utilize the information to validate or revise designs of a future version of at least one of the driveshaft and a component related to the driveshaft.

7. The system of claim 1, wherein:

the memory comprises a buffer configured for temporary storage;

the processor is further configured to utilize the buffer perform rainflow processing on the driveshaft torque data by:

applying a rainflow cycle counting rule to organize the driveshaft torque data into rainflow cycles, and generating a rainflow matrix comprising the rainflow cycles; and the memory is configured to store the rainflow matrix as part of the information.

8. The system of claim 7, wherein:

the rainflow cycle counting rule is a four-point rainflow cycle counting rule; and applying the rainflow cycle counting rule comprises:

initializing the buffer, temporarily storing, by the buffer, a plurality of driveshaft torques of the driveshaft torque data, identifying four consecutive peaks/valleys within the plurality of driveshaft torques, determining whether two intermediary peaks/valleys within the four consecutive peaks/valleys have magnitudes that are bounded by a remaining two peaks/valleys of the four consecutive peaks valleys, and when the two intermediary peaks/valleys have magnitudes that are bounded by the remaining two peaks/valleys, counting the intermediary peaks/valleys as a cycle.

9. A method for obtaining and storing driveshaft torque data for a vehicle comprising a driveshaft and an engine controller, the method comprising:

determining, by a processor of the engine controller, driveshaft torque data by utilizing a simulation model to calculate the torque at the driveshaft based on a set of vehicle data including at least one of a vehicle throttle position, a vehicle axle ratio, and a vehicle axle weight, wherein the driveshaft torque data (i) represents torque at the driveshaft for each revolution of the driveshaft over a period in a time-domain and (ii) comprises a plurality of peaks and valleys corresponding to local driveshaft torque maximums and minimums, utilizing, by the processor, a buffer of a memory of the engine controller to perform rainflow processing on the driveshaft torque data by:

applying a rainflow cycle counting rule to organize the driveshaft torque data into rainflow cycles, and generating a rainflow matrix comprising the rainflow cycles;

storing, by the memory, information comprising the rainflow matrix, the memory having a limited capacity such that it is incapable of storing the driveshaft torque data; and downloading, from the engine controller by a data collection device, the information.

10. The method of claim 9, wherein:

the rainflow cycle counting rule is a four-point rainflow cycle counting rule; and applying the rainflow cycle counting rule comprises:

initializing the buffer, temporarily storing, by the buffer, a plurality of driveshaft torques of the driveshaft torque data, identifying four consecutive peaks/valleys within the plurality of driveshaft torques, determining whether two intermediary peaks/valleys within the four consecutive peaks/valleys have magnitudes that are bounded by a remaining two peaks/valleys of the four consecutive peaks valleys, and when the two intermediary peaks/valleys have magnitudes that are bounded by the remaining two peaks/valleys, counting the intermediary peaks/valleys as a cycle.

11. The method of claim 9, wherein the data collection device is configured to download the information when the vehicle is being serviced.

12. The method of claim 11, further comprising receiving, by a central data collection center via transmission from the data collection device, the information.

13. The method of claim 12, further comprising utilizing, by the central data collection center, the information to predict a useful life of at least one of the driveshaft and a component related to the driveshaft.

14. The method of claim 13, further comprising:

using the driveshaft torque data, generating, by the processor, a revolutions-at-torque output comprising (i) a plurality of distinct ranges of driveshaft torque and (ii) counts for each driveshaft torque range, each count being indicative of a particular driveshaft torque of the driveshaft torque data falling within a particular driveshaft torque range; and storing, by the memory, the revolutions-at-torque output as part of the information.

15. The method of claim 14, further comprising predicting, by the central data collection center, the useful life of at least one of the driveshaft and the driveshaft-related component by:

converting the revolutions-at-torque output to a histogram plot; and utilizing the histogram plot to estimate a fatigue experienced by the at least one of the driveshaft and the driveshaft-related component at each of the plurality of distinct ranges of driveshaft torque.

16. The method of claim 12, further comprising utilizing, by the central data collection center, the information to validate or revise designs of a future version of at least one of the driveshaft and a component related to the driveshaft.

17. A vehicle data collection system, the system comprising:

a vehicle comprising a driveshaft and an engine controller, the engine controller comprising:

a processor configured to:

obtain driveshaft torque data that represents torque at the driveshaft for each revolution of the driveshaft over a period in a time-domain, the driveshaft torque data comprising a plurality of peaks and valleys corresponding to local driveshaft torque maximums and minimums, and using the driveshaft torque data, generate a revolutions-at-torque output comprising (i) a plurality of distinct ranges of driveshaft torque and (ii) counts for each driveshaft torque range, each count being indicative of a particular driveshaft torque of the driveshaft torque data falling within a particular driveshaft torque range, and a memory (i) having a limited capacity such that it is incapable of storing the driveshaft torque data and (ii) configured to store information comprising the revolutions-at-torque output;

a data collection device configured to download the information from the memory when the vehicle is being serviced; and a central data collection center configured to:

receive the downloaded information upon transmission by the data collection device; and utilize the information to predict a useful life of at least one of the driveshaft and a component related to the driveshaft by:

converting the revolutions-at-torque output to a histogram plot; and utilizing the histogram plot to estimate a fatigue experienced by the at least one of the driveshaft and the driveshaft-related component at each of the plurality of distinct ranges of driveshaft torque.

* * * * *